March 26, 1968     D. A. MARRA, JR     3,375,090
PROTECTIVE DEVICES FOR TORCH TIPS
Filed Sept. 15, 1965
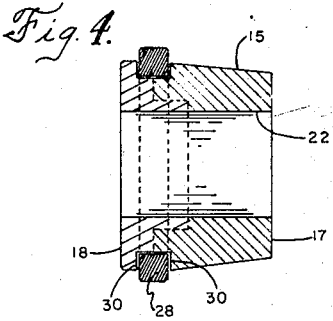
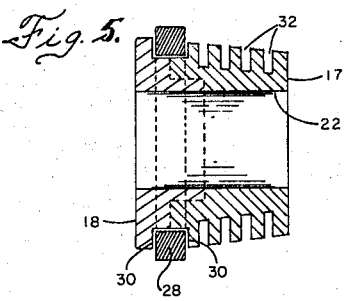
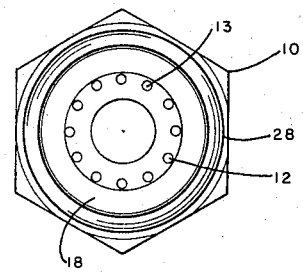
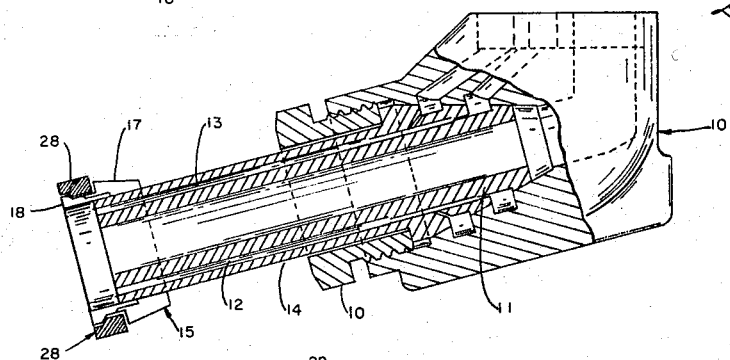
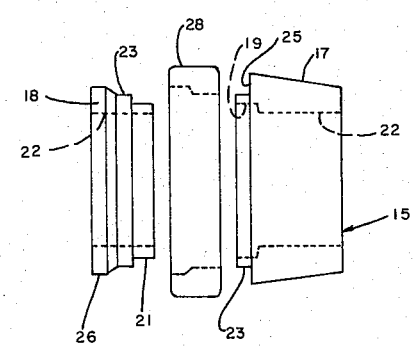
INVENTOR.
DANIEL A. MARRA, JR.
BY
ATTORNEY

United States Patent Office 3,375,090
Patented Mar. 26, 1968

3,375,090
PROTECTIVE DEVICES FOR TORCH TIPS
Daniel A. Marra, Jr., Wildwood, Pa., assignor, by mesne assignments, to Norman E. White, Butler, Pa.
Filed Sept. 15, 1965, Ser. No. 487,535
5 Claims. (Cl. 29—183.5)

This invention relates to a torch employed in scarfing steel slabs or the like and it has particular relation to a protective device formed on the end of a tip of the torch.

The primary object of the invention is to provide a protective device mounted on the end of the torch tip, in which the protective member includes a wearing ring that is free to rotate in operation.

Another object of the invention is to provide a protective member mounted on the outer end of a scarfing torch tip, in which the protective unit is formed of a plurality of elements including a wearing ring so mounted as to provide easy renewal or replacement of the wearing ring. These and other objects of the invention will be apparent from the specification and the accompanying drawings.

At present, the protective members employed at the outer end of the torch tip are formed of a one piece member known as a wearing ring. The wearing ring is secured to the outer end of the torch tip and in the scarfing operation one section of the ring will wear flat. Frequently this section will wear to a point that the ring will crack and need to be replaced. At other times the wear is such that some additional use may be obtained, but this entails releasing the wear ring from the torch tip and moving the ring to another position, then securing the ring to the torch tip.

In the present invention, I have provided a protective device formed of a plurality of elements in which the wear ring is free to rotate during the scarfing operation. In its simplest form, I provide a protective device mounted on the outer end of a torch tip, in which the protective device is formed of an inner base member and an outer base member secured together to form a single base unit to support rotatably a wearing ring on the outer diameter of the base unit. For the sake of clearness, the inner base member refers to the portion facing toward the torch, while the outer base member relates to the portion adjacent the outer end of the torch tip. For a better understanding of the invention, reference may now be had to the accompanying drawings forming a part of this specification, in which:

FIG. 1 is a longitudinal sectional view of a burner torch tip with the invention mounted thereon.

FIG. 2 is an end view of the invention shown in FIG. 1.

FIG. 3 is an elevational view of a developed form of the elements employed in the invention.

FIG. 4 is a longitudinal sectional view of a modification the invention may assume, and FIG. 5 is a longitudinal sectional view of still another modification of the invention.

In practicing the invention and referring more particularly to the drawing a nozzle 10 of an oxy-acetylene scarfing torch is formed with a torch tip 11 having conventional openings 12 and 13 for gas and oxygen is provided, together with a tubular casing 14. Mounted on the outer end of the torch tip is a base unit 15. This is best shown on FIG. 1 of the drawing. In the preferred form of the invention, shown in FIGS. 1 to 3 of the drawing, the base unit 15 embodies an inner member 17 and an outer base member 18 formed of copper. The inner member 17 is provided with a recessed portion 19 that is machined to engage a shoulder portion 21 on the outer base member for a hand press fit when the base unit is secured together, FIG. 1. The members 17 and 18 are provided with surfaces 23 of substantially less diameter than the outside diameter of the unit 15. The surface 23 on the member 17 terminates in a vertical side 25 with the member 23 of the member 18 sloping upwardly and outwardly to the outside diameter 26 of the member 18.

A wearing ring 28 formed of tungsten and cobalt in the proportions of 75 to 80% of tungsten and 20 to 25% cobalt is provided to be mounted on the base unit 15. It has been found in operation that the tungsten and cobalt composition for the wearing ring forms a cobalt oxide which gives the ring a substantial non-wearing property, which means that in many cases the torch tip will wear out before wearing ring. It has been found in addition to the above that in operation the cobalt oxide formed will not allow the molten metal or slag to adhere to the wear ring, thus providing the operator considerable easier movement of the torch tip. The surfaces of the inner diameter of the wear ring 28 are machined to the same contour but slightly greater diameter than the members 17 and 18 to provide clearance between the base members and the wearing ring. Moreover the width of the ring is slightly less than the width of the groove formed in the base unit, so that the wear ring is free to rotate when mounted for operation.

In assembly of the invention for operation as a scarfing torch for steel slabs or the like, the ring 28 is positioned on the surface 23 of the member 17 and the member 18 is then hand pressed in engagement with the member 17, with the shoulder 21 fitting into the recess 19 forming a single base unit 15. When assembled, as shown in FIG. 1, the clearance between the ring 28 base unit 15 is such as to provide rotation of the ring on the unit 15 during expansion and contraction of the metals in the scarfing operation. It has been found that to provide rotation of the wearing ring prolongs the life of the ring as much as several times longer than the life of rings presently employed.

The unit 15 is mounted on the casing 14 with the outer face of the unit 15 extending outwardly from the end of the casing 14 of the torch tip. The unit is then secured to the casing and the device is assembled for operation. When the wear ring becomes worn and requires replacement, the member 18 is released from the casing 14, removed therefrom and a new ring 28 is placed in position, then the member 18 is again secured in position.

In the modification, shown in FIG. 4 the groove in the unit 15 terminates in vertical sides 30 which rotatably support wearing ring 28. In this structure the outer side of the member 18 extends outwardly from the outer wall of the ring 28, with the face of the unit extending outwardly from the end of the casing 14.

In the modification of the invention shown in FIG. 5, the structure is similar to that of FIG. 4, except that the member 17 is provided with a plurality of grooves 32 to provide a greater area for heat dissipation of the structure.

From the foregoing description it is apparent that I have provided a protective device that is new and useful in the art of scarfing steel slabs or the like. Moreover, it is apparent that the structure described provides a unit that has considerably longer life in operation than the structures hereto employed and that the many advantages and uses of the invention will be apparent to those familiar with the art. It is understood that additional modifications may be made without departing from the scope of the appended claims.

What I claim:

1. In a torch tip for scarfing steel slabs or the like, a protective device comprising an inner base member and an outer base member secured together to form a unit mounted on the outer end of the torch tip, the base unit having a groove cut on its outer diameter and a wearing ring having sides of less width than the width of the groove and an inside diameter greater than the outside diameter of the groove for rotatably mounting the wearing on the base unit.

2. In a torch tip for scarfing steel slabs or the like, a protective device comprising an inner base member and an outer base member formed of copper secured together to form a unit mounted on the outer end of the torch tip, the base unit having a groove cut on its outer diameter and a wearing ring having from 75 to 80% tungsten and 20 to 25% cobalt, the sides of the wearing ring being of less width than the width of the groove in the base unit, with the inside diameter of the ring being greater than the outside diameter of the base for rotatably mounting the wearing ring in the groove of the base unit.

3. In a torch tip for scarfing steel slabs or the like, a protective device comprising an inner base member and an outer base member secured together to form a unit mounted on the outer end of the torch tip, a groove formed on the outside diameter of the base unit, the outer wall of the groove sloping upwardly and outwardly to the outside diameter of the unit and a wearing ring, the inside diameter of the ring slightly larger with the same contour as the groove in the base unit, for rotatably supporting the wearing ring on the base unit, with the outside face of the ring flush with the outside face of the base unit.

4. In a torch tip for scarfing steel slabs or the like, a protective device comprising an inner base member and an outer base member formed of copper secured together to form a unit mounted on the outer end of the torch tip, a groove formed on the outside diameter of the base unit, the outer wall of the groove sloping outwardly and upwardly to the outside diameter of the unit and a wearing ring having from 75 to 80% tungsten and 20 to 25% cobalt, the inside diameter of the ring slightly larger with the same contour as the groove in the base unit for rotatably supporting the wearing ring on the base unit, the outside face of the ring being flush with the outside face of the base unit.

5. In a torch tip for scarfing steel slabs or the like, a protective device comprising an inner base member and an outer base member secured together as a single unit mounted on the outer end of the torch tip, the inner base member formed with a plurality of grooves adjacent the inner end thereof for increasing the heat dissipation on the end of the torch tip, the base unit formed with a groove on its outer diameter and a wearing ring, the width of which is less than the width of the groove with the inside diameer being slightly greater than the outside diameter of the groove for rotatably mounting the wearing ring on the end of the base unit.

References Cited
UNITED STATES PATENTS

| | | | |
|---|---|---|---|
| 3,061,297 | 10/1962 | Gordon | 266—23 |
| 3,088,854 | 5/1963 | Spies | 266—23 |
| 3,172,457 | 3/1965 | Hartmann et al. | 158—27.4 |
| 3,249,349 | 5/1966 | Thompson et al. | 266—23 |

DAVID L. RECK, *Primary Examiner.*

RICHARD O. DEAN, *Examiner.*